US009777534B2

(12) United States Patent
Lin et al.

(10) Patent No.: US 9,777,534 B2
(45) Date of Patent: Oct. 3, 2017

(54) COVER OPENING DEVICE OF ELECTRIC SUNSHADE FOR SIDE WINDOW

(71) Applicant: MACAUTO INDUSTRIAL CO., LTD., Tainan (TW)

(72) Inventors: Paul Lin, Tainan (TW); Hung-Ming Yen, Tainan (TW); Chien-Wen Chen, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 114 days.

(21) Appl. No.: 14/976,017

(22) Filed: Dec. 21, 2015

(65) Prior Publication Data

US 2016/0186491 A1 Jun. 30, 2016

(30) Foreign Application Priority Data

Dec. 31, 2014 (TW) ............................ 103223491 U

(51) Int. Cl.

*F16H 25/18* (2006.01)
*E06B 9/68* (2006.01)
*E06B 9/72* (2006.01)
*E06B 9/82* (2006.01)
*E06B 9/58* (2006.01)

(52) U.S. Cl.

CPC .................. *E06B 9/68* (2013.01); *E06B 9/72* (2013.01); *E06B 9/82* (2013.01); *E06B 2009/583* (2013.01); *E06B 2009/6809* (2013.01); *E06B 2009/6818* (2013.01)

(58) Field of Classification Search

CPC ..... E06B 9/68; E06B 9/72; E06B 9/82; E06B 2009/583; E06B 2009/6809; E06B 2009/6818

See application file for complete search history.

(56) References Cited

U.S. PATENT DOCUMENTS

| | | | | |
|---|---|---|---|---|
| 9,657,516 B2 * | 5/2017 | Graybar | .................... E06B 9/70 | |
| 2012/0060331 A1 * | 3/2012 | Lin | ........................ B60J 1/2044 | 24/457 |
| 2012/0193045 A1 * | 8/2012 | Lin | ........................ B60J 7/0015 | 160/370.23 |
| 2013/0020040 A1 * | 1/2013 | Lin | ........................ B60J 1/2047 | 160/370.22 |
| 2015/0328965 A1 * | 11/2015 | Lin | ........................ B60J 1/2044 | 74/99 R |

(Continued)

*Primary Examiner* — Zakaria Elahmadi
(74) *Attorney, Agent, or Firm* — Rosenberg, Klein & Lee

(57) ABSTRACT

A cover opening device of an electric sunshade for a side window is provided for connecting between a base and a protecting cover of the electric sunshade and connecting with a curtain support rod. The cover opening device operates by the curtain support rod mounted with a driving element passing through a pedestal, a linkage rod part connected with an abutted part connecting with the protecting cover to move the abutted part downward by a press of the driving element and to pivot the protecting cover for covering a groove by the linkage rod part, and an elastic element providing resilience force for opening the protecting cover. The cover opening device has a mechanism that opens the protecting cover beforehand and closes the protecting cover afterwards, thereby preventing the curtain from colliding with the protecting cover when the curtain is extending out and rolling up.

16 Claims, 6 Drawing Sheets

(56) References Cited

U.S. PATENT DOCUMENTS

| | | | | |
|---|---|---|---|---|
| 2016/0017656 | A1* | 1/2016 | Adreon | E06B 9/322 160/7 |
| 2016/0032646 | A1* | 2/2016 | Fleischman | E06B 9/40 160/309 |
| 2016/0123076 | A1* | 5/2016 | Kirby | E06B 9/42 160/10 |

* cited by examiner

COVER OPENING DEVICE OF ELECTRIC SUNSHADE FOR SIDE WINDOW

CROSS-REFERENCE TO RELATED APPLICATIONS

This application is based upon and claims priority under 35 U.S.C. 119 from Taiwan Patent Application No. 103223491 filed on Dec. 31, 2014, which is hereby specifically incorporated herein by this reference thereto.

BACKGROUND OF THE INVENTION

1. Field of the Invention

The present invention relates to an electric sunshade for a side window that is adapted to be mounted into a side door of a vehicle, especially to a cover opening device that opens or closes a cover automatically and simultaneously with the extending out or rolling up of a curtain of the electric sunshade.

2. Description of the Prior Arts

Currently, a structure of an electric sunshade mounted into a side door of a vehicle mainly comprises a base which is mounted into the side door of the vehicle and a curtain which is disposed in the base and capable of rolling up and extending out. The curtain is driven by a curtain support rod of an electric driving mechanism. A protecting cover is disposed on a groove on the top of the base. When the curtain is driven to lift up and extend out from an inside of the base, the protecting cover can be driven to open. When the curtain is driven to roll up to the inside of the base, the protecting cover can be driven to close the groove on the top of the base.

In aforesaid structure of an electric sunshade for a side window, the protecting cover that is mounted on the top of the base can automatically open and close with the extending out and rolling up of the curtain. But the driving mechanism does not open the protecting cover before the curtain is lifted and extended, and does not close the protecting cover after the whole curtain is rolled up to the inside of the base, either. Therefore, noise is generated from a collision of the protecting cover and the curtain when the protecting cover is opening or closing and the curtain is lifting up or lowering down.

To overcome the shortcomings, the present invention provides a cover opening device of an electric sunshade for a side window of a vehicle to mitigate or obviate the aforementioned problems.

SUMMARY OF THE INVENTION

The main objective of the present invention is to provide a cover opening device of an electric sunshade for a side window of a vehicle to overcome the shortcomings that noise is generated from unavoidable colliding of the protecting cover with the curtain when the protecting cover is opening or closing and the curtain is lifting up or lowering down in a conventional curtain of an electric sunshade for the side window of a vehicle.

To achieve the aforesaid objective, the present invention provides a cover opening device of an electric sunshade for a side window of a vehicle for connecting between a base of the electric sunshade for the side window and the protecting cover pivoted on a groove located on a top of the base and for connecting a curtain support rod, and the cover opening device comprises a driving element for being mounted on the curtain support rod;

a pedestal for being mounted on the groove located on the top of the base, the pedestal having a first through hole vertically penetrating therethrough, the first through hole allowing the curtain support rod and the driving element to pass therethrough;

a linkage component including an abutted part mounted under the pedestal and the driving element of the curtain support rod, and at least one linkage rod part connected with the abutted part and connected between the abutted part and the protecting cover, wherein when the abutted part is abutted against and pressed down by the driving element mounted on the curtain support rod, the linkage rod part connected with the abutted part drives the protecting cover to pivot and cover the groove of the base; and an elastic element for connecting between the base and the protecting cover and providing resilience force for driving the protecting cover to open from the groove of the base.

When the aforementioned cover opening device is applied to the structure of the electric sunshade for the side window of a vehicle and is mounted into a door of a vehicle, the cover opening device drives the protecting cover to open at the groove of the base before the curtain support rod pushes the curtain to extend out upwardly from the groove of the base, and then the curtain extends out of the groove of the base by the pushing of the curtain support rod; in the storage process of the curtain, after the curtain is rolled up to an inside of the base by the driving of the curtain support rod, the protecting cover closes the groove of the base automatically by the driving of the cover opening device. Thus, when the curtain is extending out or rolling up, the invention avoids the noise generated from the curtain colliding with the protecting cover by a mechanism of the cover opening device which opens the protecting cover beforehand and closes the protecting cover afterward.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
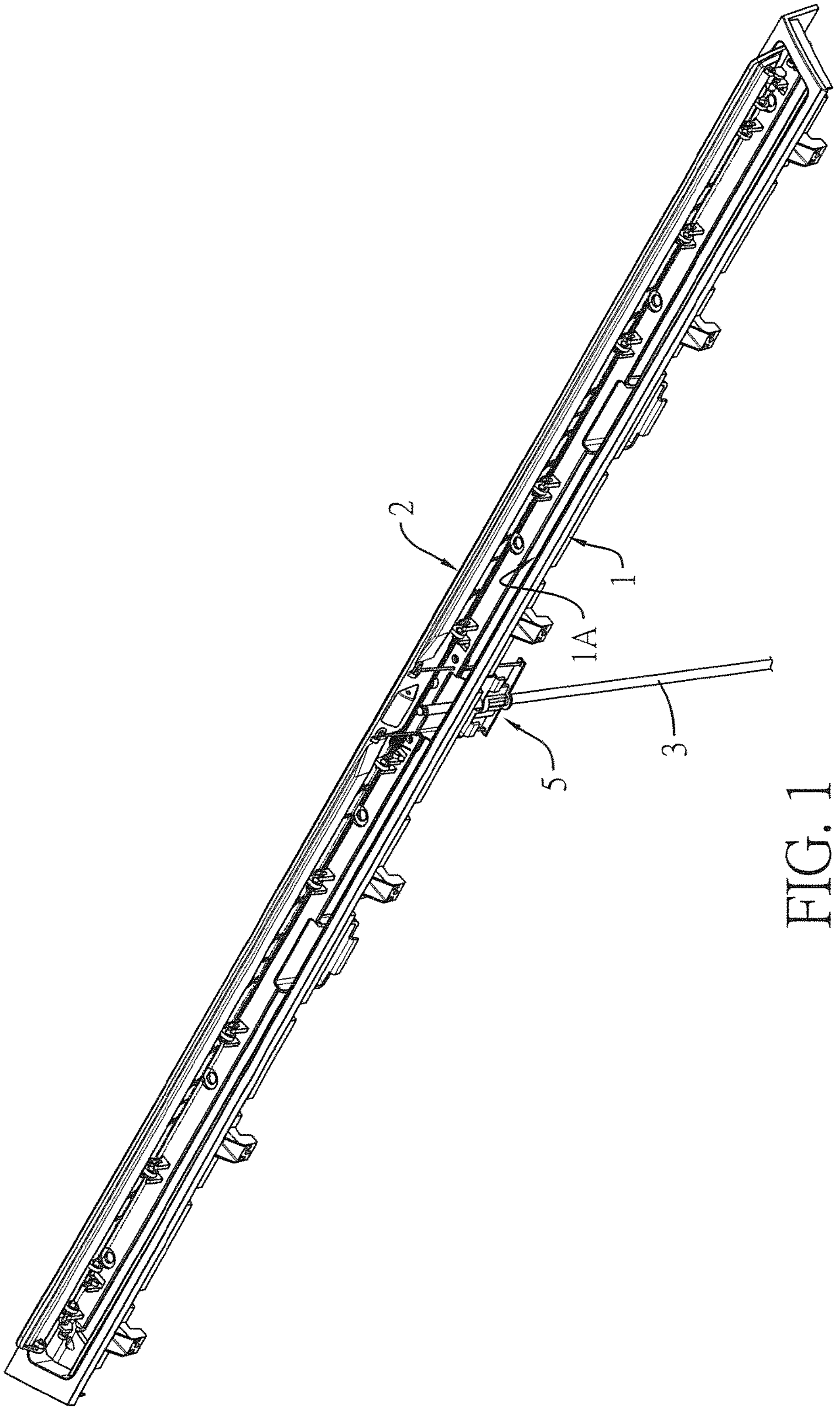
FIG. 1 is a partial perspective view of a preferred embodiment of a cover opening device, showing that the cover opening device is mounted to an electric sunshade for a side window of a vehicle.
Figure 2:
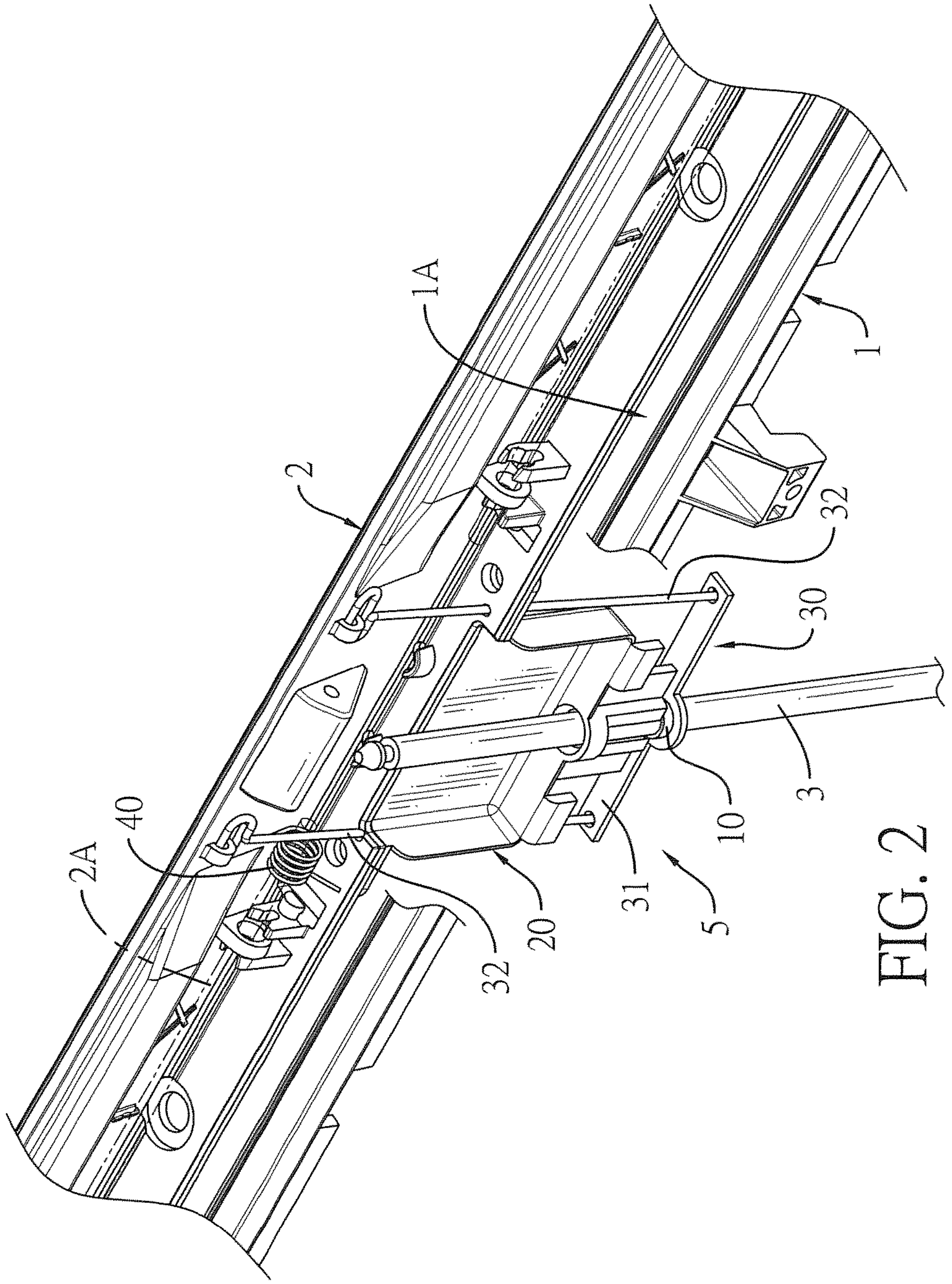
FIG. 2 is a partial enlarged view of FIG. 1.

FIGS. 1 and 2 disclose a preferred embodiment of the present invention of the cover opening device 5. The preferred embodiment is mounted between a base 1 and a protecting cover 2 of an electric sunshade for a side window of a vehicle and is connected with a curtain support rod 3. The protecting cover 2 is pivoted on a groove 1A on a top of the base 1 for opening or closing the groove 1A of the top of the base 1. The cover opening device 5 comprises a driving element 10, a pedestal 20, a linkage component 30 and an elastic element 40.

Figure 3:
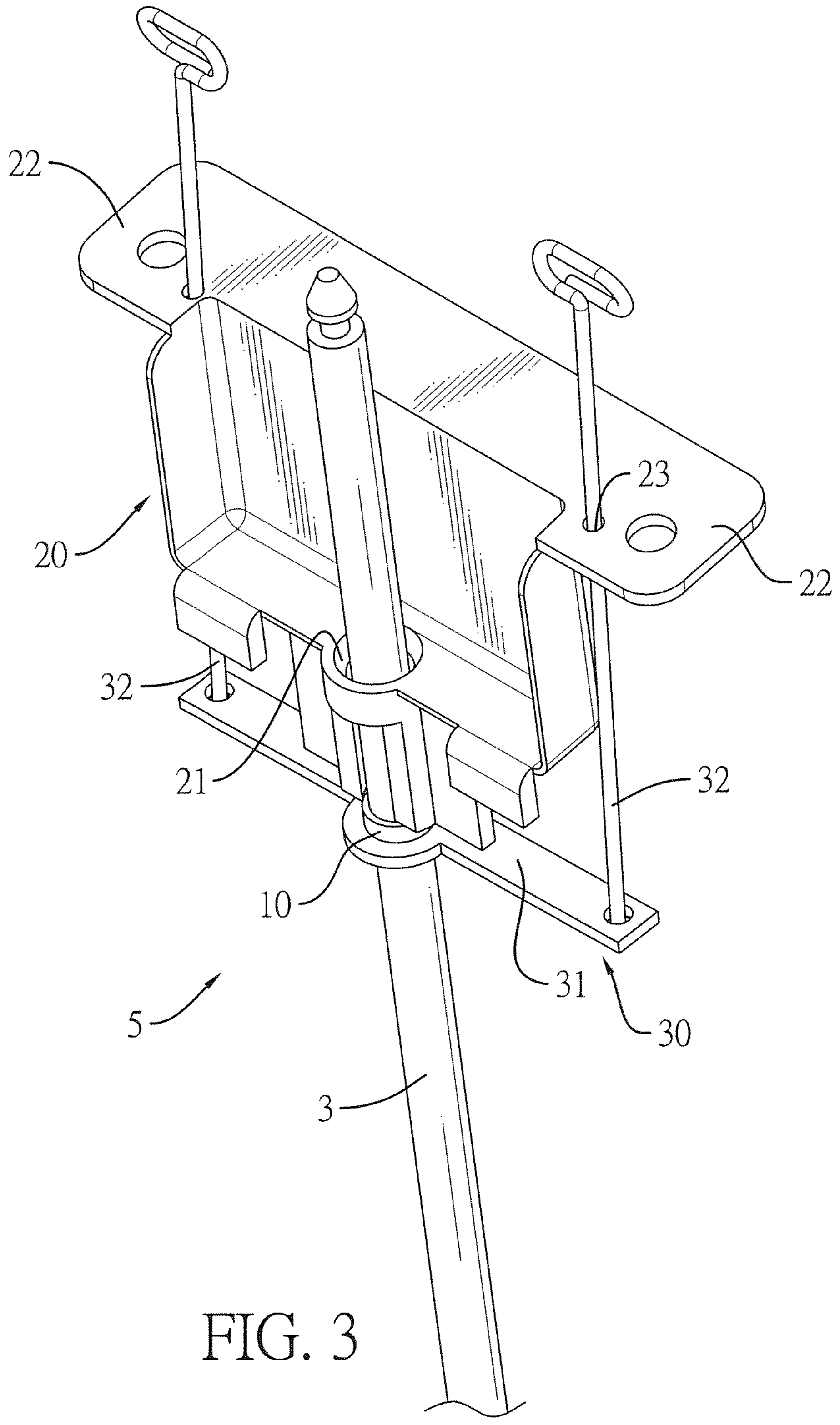
FIG. 3 is a perspective view of the cover opening device in FIGS. 1 and 2, showing the cover opening device and a curtain support rod.

With reference to FIGS. 2 and 3, the driving element 10 is configured for being mounted on an upper section of the curtain support rod 3. The driving element 10 may be integrally formed with the curtain support rod 3. Or, the driving element 10 may be an independent element mounted on the curtain support rod 3 by adhering, screwing, engaging, riveting, or other fixing means. In the preferred embodiment, the driving element 10 is a loop mounted around an outer surface of the curtain support rod 3.

With reference to FIGS. 2 and 3 again, the pedestal 20 is configured for being mounted on the groove 1A on the top of the base 1. The pedestal 20 forms a first through hole 21 vertically and axially through the pedestal 20. The curtain support rod 3 mounted with the driving element 10 is able to pass through the first through hole 21. In the preferred embodiment, each of two sides of a top of the pedestal 20 has an extending tab 22, the extending tabs 22 protrude from the two sides respectively, and the two sides are parallel to a lengthwise side of the groove 1A located on the top of the base 1. The extending tab 22 has a passage hole 23 formed through the extending tab 22 vertically.

Still with reference to FIGS. 2 and 3, the linkage component 30 includes an abutted part 31 and at least one linkage rod part 32. The abutted part 31 is under the pedestal 20 and the driving element 10 on the curtain support rod 10 for being pressed down and abutted against by the driving element 10. In the preferred embodiment, the abutted part 31 is a slice body which has a second through hole. The second through hole allows the curtain support rod 3 mounted with the driving element 10 to move through the second through hole. The linkage rod part 32 may be a steel rope or other rigid body which is bendable and resilient. A lower end of the linkage rod part 32 is connected to the abutted part 31, and an upper end of the linkage rod part 32 is extended and connected to the protecting cover 2. When the abutted part 31 of the linkage component 30 is pressed by the driving element 10 and moves downward, the linkage rod part 32 connected with the abutted part 31 can drive the protecting cover 2 to pivot and cover the groove 1A of the base 1.

Still with reference to FIGS. 2 and 3, in the preferred embodiment, the linkage component 30 includes two linkage rod parts 32. Each one of the linkage rod part 32 is a steel rope. The two linkage rod parts 32 connect to two sides of the abutted part 31 respectively, and the two sides of the abutted part 31 are parallel to the lengthwise side of the groove 1A of the base 1. The two linkage rod parts 32 penetrate upward through the passage holes 23 of the extending tabs 22 on two sides of the pedestal 20 respectively, and then connect to the protecting cover 2.

With reference to FIG. 2, the elastic element 40 is configured for connecting between the base 1 and the protecting cover 2, and providing resilience force for driving the protecting cover 2 and uncovering the groove 1A of the base 1. The elastic element 40 may be a torsion spring or any other element that is able to provide resilience force to open the protecting cover 2. In the preferred embodiment, the elastic element 40 is a torsion spring. The torsion spring is mounted around a pivot rod 2A of the protecting cover 2, and the pivot rod 2A pivots on the base 1. Two ends of the torsion spring are mounted against the base 1 and the protecting cover 2 respectively.

Figure 6:
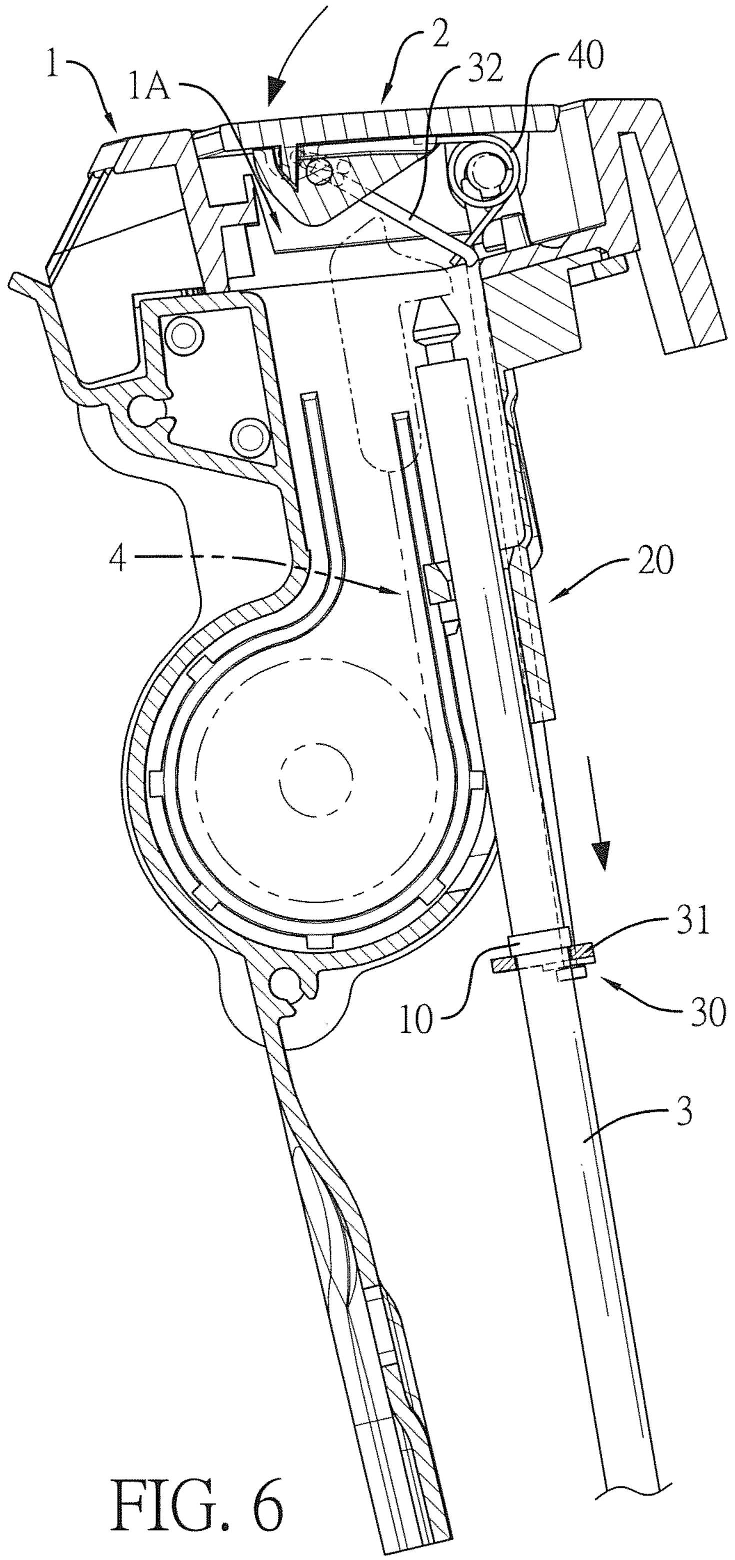
FIG. 6 is a lateral sectional view of the cover opening device, showing that the cover opening device is mounted to the electric sunshade for the side window of a vehicle, and the curtain is rolled up and a protecting cover is closed on a base.

With reference to FIG. 6, the cover opening device 5 of the present invention is applied to an electric sunshade for the side window of a vehicle. When the curtain 4 of the electric sunshade for the side window of a vehicle is in a storage state, the cover opening device 5 uses the driving element 10 on the curtain support rod 3 to press downward against the abutted part 31 of the linkage component 30, and uses the at least one linkage rod part 32 of the linkage component 30 to pull the protecting cover 2 to cover the groove 1A of the base 1. In the meantime, the at least one linkage rod part 32 can be bended by its resilience in accordance with the protecting cover 2 covering the groove 1A of the base 1.

Figure 4:
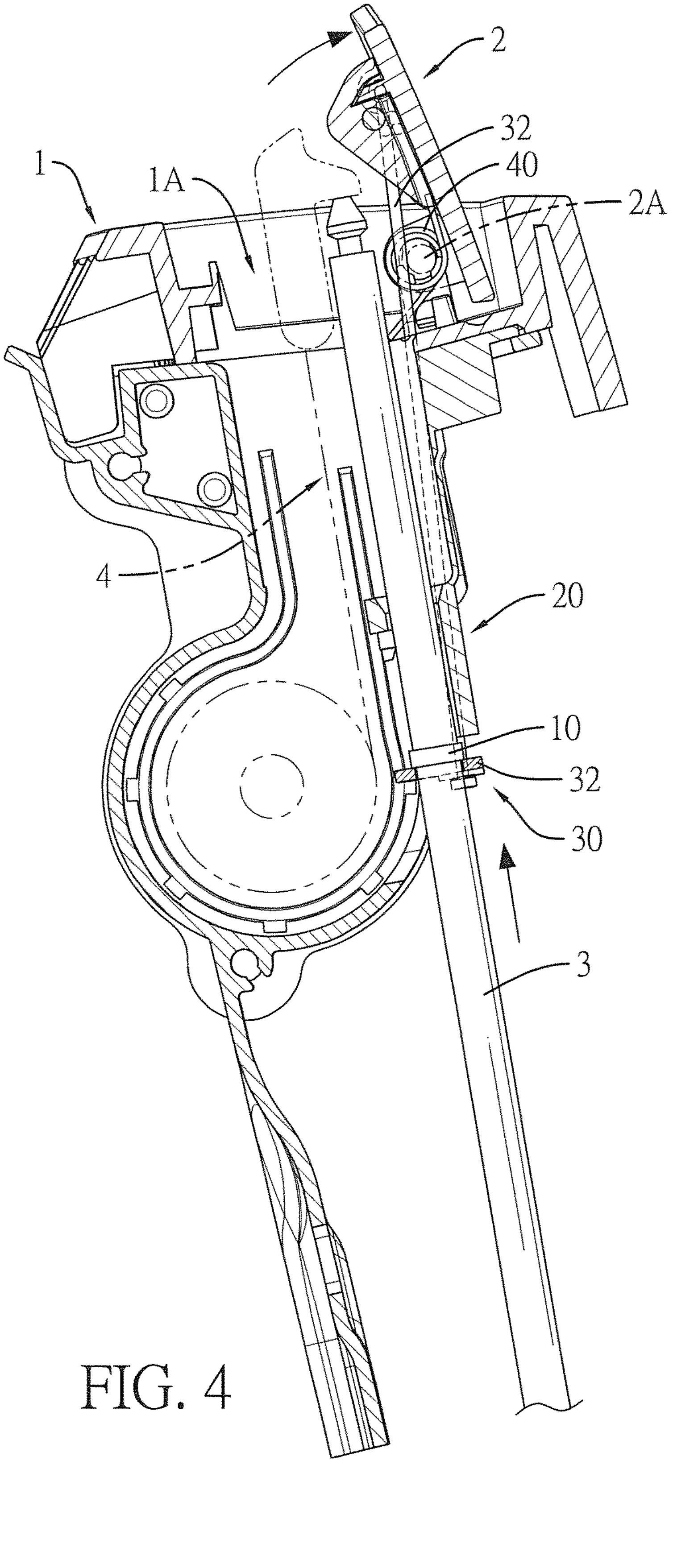
FIG. 4 is a lateral sectional view of the cover opening device, showing that the cover opening device is mounted to the electric sunshade for the side window of a vehicle as a curtain extends out.
Figure 5:
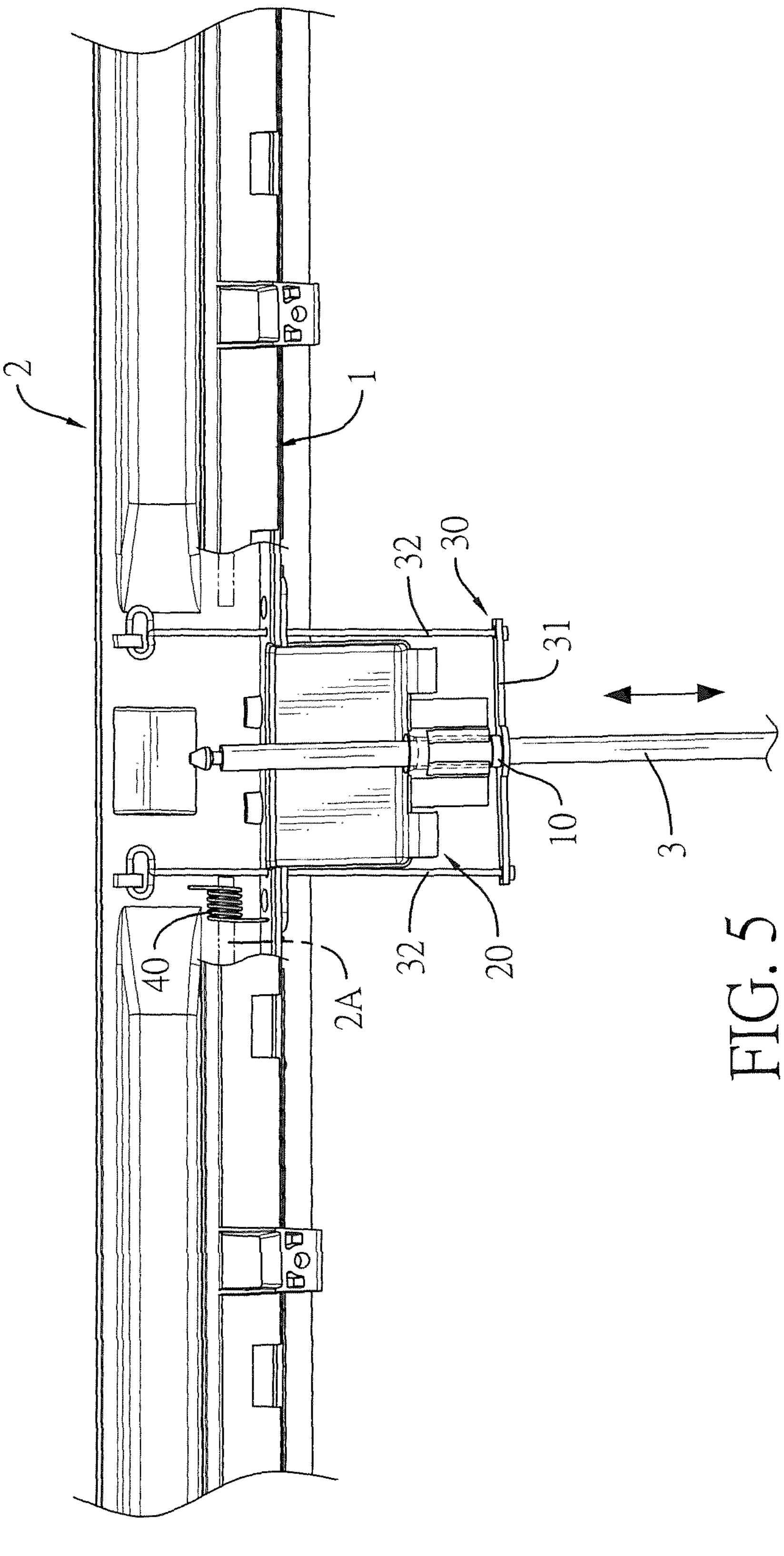
FIG. 5 is a front plan view of the cover opening device, showing that the cover opening device is mounted to the electric sunshade for the side window of a vehicle.

With reference to FIGS. 4 and 5, when the electric sunshade extends the curtain 4, the electric sunshade uses a driving mechanism to lift the curtain support rod 3. When the curtain support rod 3 is lifted, the driving element 10 is lifted with the curtain support rod 3 but does not press down the abutted part 31 of the linkage component 30. At this moment, the protecting cover 2 is opened sideward automatically at the groove 1A of the base 1 beforehand by the resilience which the elastic element 40 provides to the protection cover 2. And then, the driven curtain support rod 3 lifts up the curtain 4 and extends the curtain 4 out of the groove 1A of the base 1. When the curtain 4 is lifted up from the groove 1A of the base 1, the protecting cover 2 is opened beforehand so that the curtain 4 may not collide with the protecting cover 2 as the curtain 4 extends out from the base 1.

With reference to FIGS. 5 and 6, in the storage process of the curtain 4, the cover opening device 5 uses the driving mechanism to drive the curtain support rod 3 to pull down the curtain 4 and to cooperate with a rolling mechanism inside of the base 1 to roll up the curtain 4 automatically. After the whole curtain 4 is rolled up to the inside of the base 1, the driving element 10 on the curtain support rod 3 presses down the abutted part 31 of the linkage component 30, and further the at least one linkage rod part 32 of the linkage component 30 pulls the protecting cover 2 to cover the groove 1A of the base 1 automatically.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cover opening device of an electric sunshade for a side window, wherein the cover opening device is configured for connecting between a base of the electric sunshade for the side window and a protecting cover pivoted on a groove located on a top of the base and for connecting a curtain support rod, and the cover opening device comprises:

- a driving element for being mounted on the curtain support rod;

a pedestal for being mounted on the groove located on the top of the base, the pedestal having a first through hole vertically formed therethrough, the first through hole allowing the curtain support rod and the driving element to pass therethrough;

a linkage component including an abutted part mounted under the pedestal and the driving element of the curtain support rod, and at least one linkage rod part connected with the abutted part and connected between the abutted part and the protecting cover, wherein when the abutted part is abutted against and pressed down by the driving element mounted on the curtain support rod, the at least one linkage rod part connected with the abutted part drives the protecting cover to pivot and cover the groove of the base; and an elastic element for connecting between the base and the protecting cover and providing resilience force for driving the protecting cover to open from the groove of the base.

2. The cover opening device as claimed in claim 1, wherein the pedestal has two extending tabs respectively and transversely protruding from two sides of a top of the pedestal that are parallel to a lengthwise side of the groove located on the top of the base;

two passage holes respectively and vertically formed through the extending tabs;

the abutted part of the linkage component has a second through hole allowing the curtain support rod mounted with the driving element to move therethrough;

the linkage component includes two linkage rod parts respectively connected to two sides of the abutted part that are parallel to the lengthwise side of the groove of the base, the two linkage rod parts respectively and upwardly passing through the passage holes of the extending tabs and then connected to the protecting cover.

3. The cover opening device as claimed in claim 1, wherein the driving element is a loop mounted around an outer surface of the curtain support rod.

4. The cover opening device as claimed in claim 2, wherein the driving element is a loop mounted around an outer surface of the curtain support rod.

5. The cover opening device as claimed in claim 1, wherein the elastic element is a torsion spring, the torsion spring is mounted around a pivot rod of the base, the protecting cover pivots on the pivot rod; two ends of the torsion spring respectively abut the base and the protecting cover.

6. The cover opening device as claimed in claim 2, wherein the elastic element is a torsion spring, the torsion spring is mounted around a pivot rod of the base, the protecting cover pivots on the pivot rod; two ends of the torsion spring respectively abut the base and the protecting cover.

7. The cover opening device as claimed in claim 3, wherein the elastic element is a torsion spring, the torsion spring is mounted around a pivot rod of the base, the protecting cover pivots on the pivot rod; two ends of the torsion spring respectively abut the base and the protecting cover.

8. The cover opening device as claimed in claim 4, wherein the elastic element is a torsion spring, the torsion spring is mounted around a pivot rod of the base, the protecting cover pivots on the pivot rod; two ends of the torsion spring respectively abut the base and the protecting cover.

9. The cover opening device as claimed in claim 1, wherein the linkage rod part is a bendable and resilient steel rope.

10. The cover opening device as claimed in claim 2, wherein the linkage rod part is a bendable and resilient steel rope.

11. The cover opening device as claimed in claim 3, wherein the linkage rod part is a bendable and resilient steel rope.

12. The cover opening device as claimed in claim 4, wherein the linkage rod part is a bendable and resilient steel rope.

13. The cover opening device as claimed in claim 5, wherein the linkage rod part is a bendable and resilient steel rope.

14. The cover opening device as claimed in claim 6, wherein the linkage rod part is a bendable and resilient steel rope.

15. The cover opening device as claimed in claim 7, wherein the linkage rod part is a bendable and resilient steel rope.

16. The cover opening device as claimed in claim 8, wherein the linkage rod part is a bendable and resilient steel rope.

* * * * *